Jan. 19, 1965
W. E. DUNN
3,166,065
ICE MELTING SYSTEM
Filed July 18, 1961
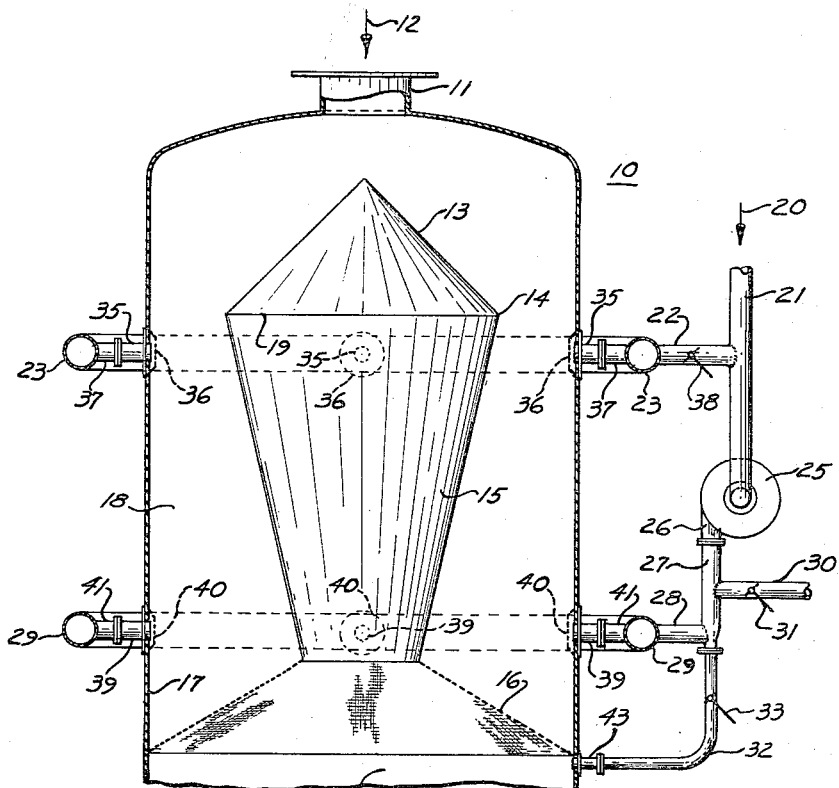
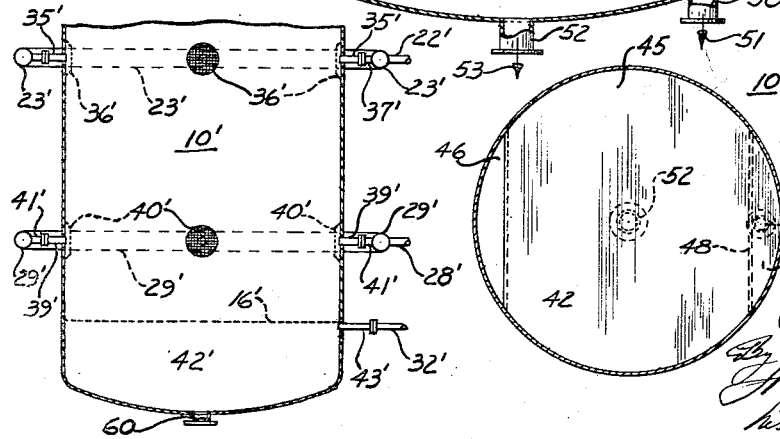
INVENTOR
William Earl Dunn

United States Patent Office 3,166,065
Patented Jan. 19, 1965

3,166,065
ICE MELTING SYSTEM
William Earl Dunn, Mount Lebanon Township, Allegheny County, Pa., assignor to Blaw-Knox Company, Pittsburgh, Pa., a corporation of Delaware
Filed July 18, 1961, Ser. No. 124,924
4 Claims. (Cl. 126—343.5)

This invention relates to an ice melting system by direct heat exchange between a vaporized fluid and ice. More particularly, this invention pertains to continuous cycle apparatus and method for melting relatively salt-free ice by direct contact with a condensible vapor which, preferably, is a butane.

Great efforts are presently being made for the production of relatively salt-free water from saline waters utilizing steps of freezing the saline water to produce a relatively salt-free ice, washing such ice to remove concentrated saline material therefrom and melting the washed ice to recover it as relatively salt-free water. Such a practice normally utilizes a vaporizable hydrocarbon refrigerant, such as a butane, as a liquid refrigerant under pressure in such freezing to provide continuous freeze crystallization and formation of such ice. After such washing, the washed ice is transferred to a melting area where the vaporized refrigerant preferably is utilized as a melting agent for the washed ice by direct heat exchange therewith.

The present invention concerns itself with a new way for the melting of such washed ice to obtain relatively more rapid and economical melting. Under the present invention in a continuous cycle operation, melting preferably is caused to occur while relatively salt-free ice is descending between the place of production of the washed ice and the place of collection of product ice water and condensed vapor, which vapor usually is the vaporized refrigerant from a previous freezing operation. Thereby, the crystalline ice particles when engaged by the gaseous melting agent are in such loose well-dispersed form as to provide maximal surface for contact with the melting agent before such particles have an opportunity to come to rest or otherwise consolidate into more of a mass presenting less available surface to the melting agent.

Other objects, features and advantages of this invention will be apparent from the following description and the accompanying drawings, which are illustrative only, in which FIGURE 1 is a schematic view in elevation and cross section through the vertical axis of one embodiment of a melting device of this invention;

FIGURE 2 is a view in section taken along line II—II of FIGURE 1; and

FIGURE 3 is a schematic view in elevation and cross section through the vertical axis of a portion of another embodiment of a melting device of this invention.

Referring to FIGURES 1 and 2 of the drawings illustrating one embodiment of a melting device of this invention, there is shown therein a cylindrical melting vessel 10 having an inlet 11 into which ice particles, which are crystalline in nature, are fed in the direction of arrow 12, generally through a conduit or other connection forming a continuous passage to and with inlet 11. Such ice may be ice which has been washed free of solute such as salt so that ice water produced in vessel 10 is relatively solute-free. Ice particles so supplied to vessel 10 descend therein by gravity and in falling encounter a distributor member 13 in the form of a cone at the top of a central core 14 having a lower portion 15 in the form of an inverted conical frustum, or the ice may be distributed by mechanical means. Core 14 may be supported by any suitable means. Screen 16 extends between the lower end of core 14 and the vertical wall 17 of vessel 10.

In descending through the annular passage 18 between base 19 of cone 13 and screen 16, the ice particles will fall through a space of increasing horizontal cross section as they proceed downwardly. In such falling, the ice particles will be melted while in loose descending dispersion inhibiting consolidation of such ice particles and offering maximal surface thereof to the melting agent supplied to passage 18 in the form of a vaporized fluid which, for example, may be vaporized normal butane or isobutane, or other vaporized fluid miscible or immiscible relative to the ice water. Such melting agent may, if desired, be vaporized refrigerant used in producing the ice supplied to vessel 10 for melting. Ice, if any, remaining unmelted during its descent through passage 18 will come to rest on screen 16 and there be melted by such melting agent, or by other means such as resistance heating of such screen by the passage of electrical current therethrough. Preferably, all of the ice supplied to vessel 10 is melted in the course of its movement through vessel 10 toward screen 16 in the lower part thereof.

Melting agent is conducted in the direction of an arrow 20 to vessel 10 through a pipe 21, one branch 22 of which is in connected communication with a return ring manifold 23, the flow normally being from manifold 23 into branch 22 and from thence into pipe 21. The delivery end of pipe 21 extends to the inlet of a compressor 25 having an outlet 26 in connected communication with a pipe 27 having a branch 28 in connected communication with a supply ring manifold 29. A vent, bypass or draw-off pipe 30 branches off from pipe 27 and has a regulating damper 31, the pipe 30 being utilizable to remove, e.g., relatively incondensible gas to exhaust, or to a secondary compressor, depending upon the conditions of operation of vessel 10. Pipe 27 is continued by a further pipe 32 also having a regulating damper or valve 33 therein. The delivery end of pipe 32 communicates with a pipe fitting 43 and may be used to equalize pressure below screen 16 in vessel 10 and/or to supply a relatively small quantity of vaporized melting agent to melt any ice which may fall upon screen 16. Preferably, suitable lagging is provided for vessel 10 and the various pipe and other connections thereto to reduce the effect of any change in ambient temperature at the place where the device is located.

Vessel 10 at its upper return level is provided with flanged fittings 35 at the cardinal points, such fittings communicating with the interior of the vessel and passage 18 for the outflow of any uncondensed vaporized fluid used as a melting agent in vessel 10. The inner open ends of fittings 35 are covered with circular screens 36 to prevent any ice from entering pipes 35 and 23. Fittings 35 are connected by manifold stub passages 37 to the interior of the return manifold 23 and the outflow pressure may be regulated by damper 38 in branch 22 as uncondensed vaporized melting agent, if any, is recycled to passage 21 through branch 22. Preferably, device 10 is operated with a slight surplus of melting agent above the quantity required to melt all the ice entering vessel 10.

At the lower level of supply manifold 29, vessel 10 is provided with flange fittings 39 at the cardinal points around its periphery, such fittings communicating with the lower end of passage 18 in vessel 10. Screens 40 similar to screens 36 cover the inner end openings of the fittings 39 and such fittings are connected to supply manifold 29 by manifold stub passages 41. Supply branch 28 for vaporized melting agent, which branch may also have a regulating damper therein, supplies such melting agent to manifold 29 and from thence to the several fittings 39. Such melting agent so supplied enters through the openings in the screens 40 and fully contacts ice descending in passage 18 as the melting agent rises causing the melting agent to give up its heat of vaporization, and possibly some sensible heat, causing the ice particles so engaged thereby to be melted into ice water. Such melting operation also causes, in a preferable operation, substantially all of the vaporized fluid used as a melting agent to condense in annular passage 18 and fall as rain with the ice water into chamber 42 at the bottom of vessel 10 through the openings in screen 16 and any ice particles that may be thereon. In a preferable operation, substantially no ice will reach screen 16 and but a small portion of vaporized fluid admitted as a melting agent into the interior of vessel 10 will remain uncondensed to be drawn out through fittings 35 and manifold 23 for recycling, or other disposition if desired.

Just below screen 16, vessel 10 is provided with fitting 43 which communicates with the interior thereof and thereby is in connected communication with pipe 32. In this way, a relatively small quantity of vaporized fluid used as a melting agent may be admitted to vessel 10 below screen 16 for pressure equalization above and below screen 16 and/or for melting of any ice which may fall upon screen 16 either during start-up of an operation or during the on-stream phase of the operation if melter 10 is operated in such a way as to enable some small portion of the ice particles to fall upon screen 16, even though the overwhelming preponderance of ice particles supplied to the top of vessel 10 will be melted en route by direct engagement with the vaporized fluid used as a melting agent. Normally, the pressure regulation set for the admission of gas in the form of vaporized fluid to vessel 10 and for any return therefrom of any portion of such gas, will be such that but a minute pressure differential will exist between the level of manifold 29 and the level of manifold 23 and the quantity of gas so admitted, as aforesaid, will be sufficient to melt all of the ice supplied to the interior of vessel 10 in the illustrated embodiment being described.

In the illustrated operation described, the "rain" comprising melted ice and condensed melting agent falls from passage 18 into chamber 42 below screen 16 and runs off substantially horizontal plate 45 through a segmental opening 46 at one end thereof into a lower separating chamber 47 at the bottom of vessel 10. Separator 47 has sufficient capacity to permit time for the two liquids entering chamber 42 to separate when those liquids are of different specific gravities and immiscible one in the other, as is the case with water and liquid butane. Separator 47 is divided by a vertical partition 48 extending from the bottom of vessel 10 upwardly toward the underside of plate 45 to provide a weir chamber 49 for the lighter liquid which in the illustration would be the butane, such butane being withdrawn from chamber 49 through an outlet 50 at the bottom thereof in the direction of arrow 51. The heavier liquid, product ice water in this instance, settles at the bottom of chamber 47 and is withdrawn therefrom through outlet 52 in the direction of arrow 53, or other separating arrangements may be provided. Or, the combined liquids may be withdrawn together for separation when desired at a location removed from the melting device as is the case in the embodiment of FIGURE 3.

The operation of vessel 10 appears from the foregoing and is a continuous cycle when equilibrium conditions are reached. In the operation of vessel 10, as the vaporized melting agent rises, it is progressively condensed under uniform conditions promoted by the narrowing cross sectional area of passage 18 toward the intake screens 36 through which any surplus vaporized melting agent is removed along with relative incondensibles in the system including air are released upon the melting of ice particles in vessel 10. Thus, in this system, melting of ice particles takes place when the surface availability thereof is at a maximum before any tendency thereof to consolidate is manifested as upon coming to rest and the system is kept from any tendency to become gas-bound and developing changes in the orifice condition thereof such as might occur upon any consolidation of ice crystals if a substantial quantity of ice particles should rest upon a screen.

The further partial embodiment illustrated in FIGURE 3 is provided in respect of its parts corresponding in construction and functioning to parts in the embodiment of FIGURES 1 and 2, with the same reference numerals with the addition of a prime accent thereto. In the FIGURE 3 embodiment, ice particles may be supplied thereto in a central stream from above or annularly or over the whole horizontal cross sectional area and in descending through the interior of vessel 10', such particles move freely toward relatively horizontal screen 16'. Melted ice water and condensed melting agent vapor pass through 16' into a common chamber 42' at the bottom of vessel 10' from which both are pumped through an outlet 60 at the bottom for removal to suitable equipment, be it gravity separation, distillation separation as in the case of miscible liquids, or other treatment equipment.

It may be desirable in a practice of the invention to have the upward flow of vapors at sufficient velocity to exert some retarding influence upon the descent of ice crystals in the melting zone. Further, the ice particles may not be falling particles, but may be thrown instead by some suitable ejector so as to provide a loose dispersion and optimal surface availability such as is present during a practice of this invention with free fall of ice crystal particles, or such fall slowed down somewhat by the velocity of the ascending vapors.

Various changes may be made in details of the illustrated embodiments and other vapor circulation hook-up and vessel arrangements provided without departing from the spirit of this invention or the scope of the appended claims.

I claim:

1. In an ice melting system, steps comprising, in combination, discharging substantially water-free particles of ice to be melted into a vessel having a passage for the descent of said particles of ice therein a substantial distance through space, introducing vaporized fluid into said passage and space to engage said particles of ice during the descent thereof, said vaporized fluid being in a quantity substantially sufficient to melt substantially all of said ice during the descent thereof in said passage, condensing said vaporized fluid in the course of said melting, withdrawing at least water and condensed vapor from said vessel, said introduction of said vaporized fluid into said vessel being in a lower portion of said passage, bleeding a lesser amount of vaporized fluid into said vessel adjacent but below the lower end of said passage, and restraining any unmelted particles of ice from leaving said passage.

2. Ice melting apparatus, comprising, in combination, a melting vessel comprising an enclosed space, means for supplying ice particles to the upper portion of said vessel to fall relatively freely therein, centrally extending means within said vessel to define an annular passage through said space for descent of said ice particles therein, means for introducing a melting agent in the form of a vaporized fluid into the lower portion of said passage to rise therein and engage said falling ice particles and melt them, means for withdrawing gas including any uncondensed fluid from the upper portion of said vessel, a screen at the bottom of said passage to catch any unmelted ice particles, a collector adjacent the bottom of said vessel, means for removing ice water and condensed fluid therefrom, a substantially horizontal plate positioned below said screen with an opening to one side thereof into which said ice water and condensed fluid drain, a separating chamber beneath said plate, and a partition extending upwardly from the bottom of said vessel toward the underside of said plate to provide means for separate removal from said vessel of said ice water and condensed fluid.

3. Ice melting apparatus, comprising, in combination, a melting vessel, means for supplying ice particles to the upper portion of said vessel to fall relatively freely therein, centrally extending means within said vessel to define an annular passage for descent of said ice particles, means for introducing a melting agent in the form of a vaporized fluid into the lower portion of said passage to rise therein and engage said falling ice particles and melt them, means for withdrawing gas including any uncondensed fluid from the upper portion of said vessel, a screen at the bottom of said passage to catch any unmelted ice particles, a collector adjacent the bottom of said vessel, means for removing ice water and condensed fluid therefrom, said means for introducing including a manifold for discharge of vaporized fluid into said passage adjacent the lower end thereof, said means for withdrawing gas including a manifold adjacent the upper end of said passage, and means for recycling gas so withdrawn to said first-named manifold.

4. Ice melting apparatus, comprising, in combination, a melting vessel, means for supplying ice particles to the upper portion of said vessel to fall relatively freely therein, centrally extending means within said vessel to define an annular passage for descent of said ice particles, means for introducing a melting agent in the form of a vaporized fluid into the lower portion of said passage to rise therein and engage said falling ice particles and melt them, means for withdrawing gas including any uncondensed fluid from the upper portion of said vessel, a screen at the bottom of said passage to catch any unmelted ice particles, a collector adjacent the bottom of said vessel, means for removing ice water and condensed fluid therefrom, manifold means to admit a predetermined relatively small quantity of said vaporized fluid to said vessel adjacent but below said screen, and means to regulate a vaporized fluid pressure differential between said upper and lower portions.

References Cited in the file of this patent

UNITED STATES PATENTS

| | | |
|---|---|---|
| 980,314 | McGill | Jan. 3, 1911 |
| 1,360,238 | McGill | Nov. 23, 1920 |
| 2,576,058 | Weber | Nov. 20, 1951 |
| 2,800,001 | Wenzelberger | July 23, 1957 |
| 3,017,751 | Hawkins | Jan. 23, 1962 |
| 3,017,752 | Findlay | Jan. 23, 1962 |
| 3,095,296 | Colton et al. | June 25, 1963 |

FOREIGN PATENTS

| | | |
|---|---|---|
| 70,507 | Norway | June 3, 1946 |
| 806,727 | Great Britain | Dec. 31, 1958 |